July 22, 1958
E. R. ALLER
2,844,411
APPARATUS FOR UNLOADING HOPPERS
Filed Feb. 7, 1955
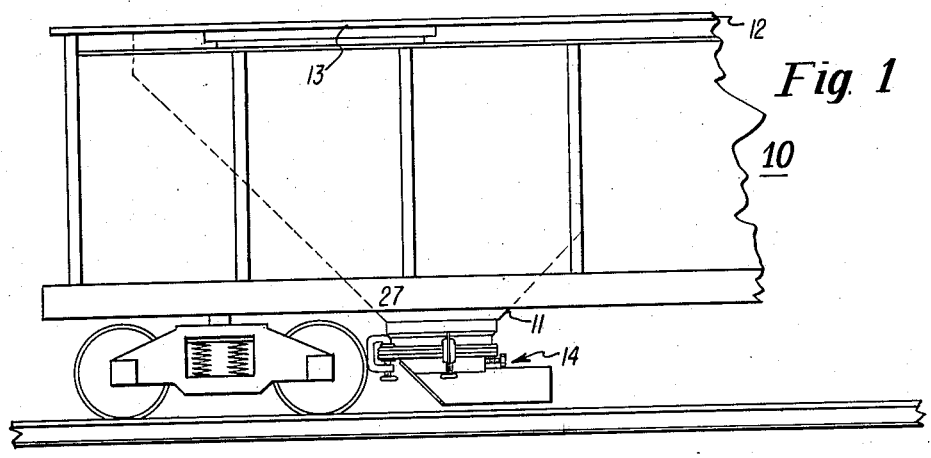
Fig. 1
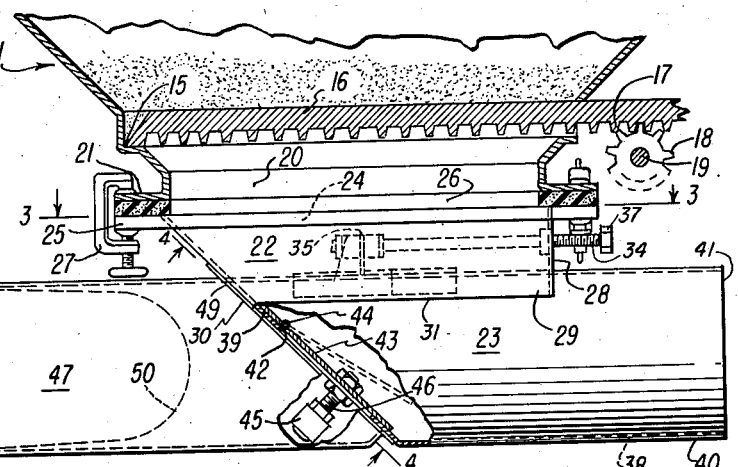
Fig. 2
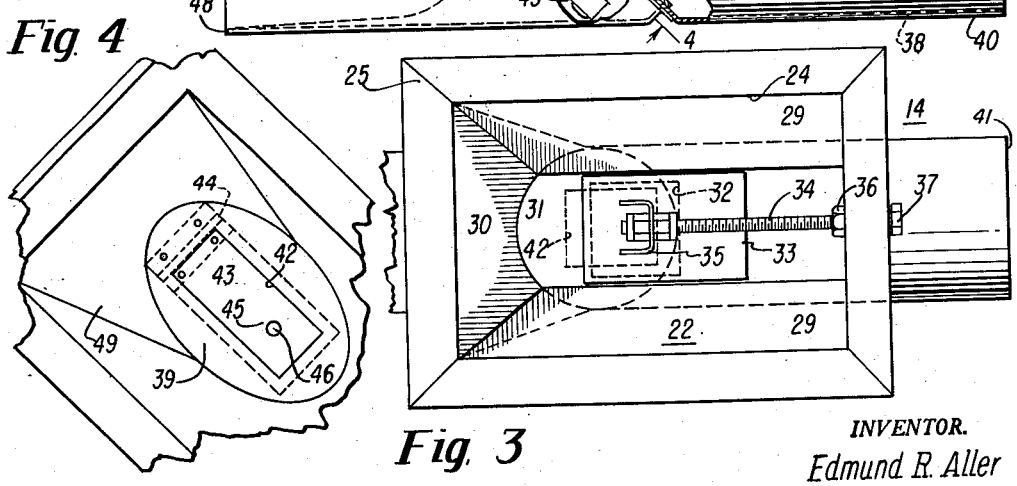
Fig. 4
Fig. 3
INVENTOR.
Edmund R. Aller
BY Smith, Olsen, Baird
& Gulbrandsen, Attys.

United States Patent Office 2,844,411
Patented July 22, 1958

2,844,411

APPARATUS FOR UNLOADING HOPPERS

Edmund R. Aller, Ogden Dunes, Ind., assignor to General American Transportation Corporation, Chicago, Ill., a corporation of New York Application February 7, 1955, Serial No. 486,581

8 Claims. (Cl. 302—51)

The present invention relates to apparatus for unloading hoppers and particularly hopper-type railway cars.

Suction conveyor systems are now used widely for unloading bulk materials from hopper-type railway cars; and almost any granular, crushed or finely divided material capable of flow can be handled in this manner; a few examples of such materials being: grains, grain flour, borax, salt, soda ash, pulverized coal, sand, lime, dried clays, etc.; and hereafter such materials are referred to as "pulverulent materials."

A conveyor suction system of this type comprises an auxiliary hopper that is detachably secured to the main hopper below the bottom outlet therein, a suction nozzle connected to the auxiliary hopper, remote suction and separating equipment, and a flexible line or hose extending between the suction nozzle and the equipment mentioned. The pulverulent material and the air therein (commonly referred to as "main air") pass from the main hopper through the bottom outlet therein into the auxiliary hopper; and in the auxiliary hopper additional air (commonly referred to as "auxiliary air") is added to or mixed with the pulverulent material and the main air to produce a composite air stream laden with the pulverulent material (commonly referred to as the "conveying air") that is drawn from the auxiliary hopper into the connected suction nozzle.

In the operation of a suction conveyor system of the type described, there is an optimum range of the ratio between the pulverulent material and the air in the conveying air in order to obtain maximum conveying efficiency thereof, wherein the equipment is neither overloaded nor underloaded; which ratio depends upon several factors, including the specific gravity of the pulverulent material, the mesh thereof, the moisture content thereof, etc.

Heretofore such suction conveyor systems have not provided facilities for selectively controlling the amount of auxiliary air admitted into the auxiliary hopper so as to obtain the optimum ratio between the pulverulent material and the air in the conveying system, whereby the conveying efficiencies thereof have been subject to wide fluctuations.

Accordingly, it is a general object of the present invention to provide improved apparatus for unloading a pulverulent material from a hopper provided with a bottom outlet, which apparatus is so constructed and arranged that it may be detachably secured to the hopper below its bottom outlet, and which may be readily adjusted so as to establish the desired ratio between the pulverulent material and the air in the conveying air, all in a ready and simple manner.

Another object of the invention is to provide apparatus of the character described, that incorporates both an arrangement for selectively controlling the feed of the pulverulent material thereinto and an arrangement for selectively controlling the feed of the auxiliary air thereinto, whereby the desired ratio between the pulverulent material and the air in the resulting conveying air may be readily established and maintained so as to achieve maximum conveying efficiency.

A further object of the invention is to provide apparatus of the character described, which incorporates an arrangement responsive to the pressure therein for automatically controlling the feed of the auxiliary air thereinto.

A further object of the invention is to provide apparatus of the character described, wherein the arrangement for automatically controlling the feed of the auxiliary air thereinto also insures thorough distribution of the pulverulent material therein into the auxiliary air and the consequent production of conveying air of proper consistency.

A further object of the invention is to provide in apparatus of the character described, an arrangement for preventing the escape of the pulverulent material from the auxiliary air opening into the apparatus in the event the operation of the associated suction system is arrested for any reason before the connected hopper is empty.

A further object of the invention is to provide in apparatus of the character described, an arrangement for controlling the rate of flow of the pulverulent material from the connected hopper so that the flow rate may be matched to the conveying capacity of the associated suction system.

A still further object of the invention is to provide apparatus of the character described that is of simple and rugged construction and arrangement.

Further features of the invention pertain to the particular arrangement of the elements of the apparatus for unloading hoppers, whereby the above-outlined and additional operating features thereof are attained.

The invention, both as to its organization and method of operation, together with further objects and advantages thereof, will best be understood by reference to the following specification taken in connection with the accompanying drawing, in which:

Figure 1 is a combined fragmentary side elevational view of a railway car of the hopper-type and full side elevational view of unloading apparatus embodying the present invention;

Fig. 2 is a combined enlarged fragmentary vertical sectional view of the lower portion of the main hopper incorporated in the railway car of Fig. 1 and full side elevational view, partly in vertical section and partly broken away, of the unloading apparatus detachably secured thereto;

Fig. 3 is an enlarged fragmentary plan view of the unloading apparatus, taken in the direction of the arrows along the line 3—3 in Fig. 2; and Fig. 4 is an enlarged fragmentary oblique view of the rear end wall of the casing incorporated in the apparatus, with the filter conduit removed, and taken in the direction of the arrows in the plane 4—4 in Fig. 2.

Referring now to Fig. 1 of the drawing, there is illustrated a railway car 10 of the conventional hopper-type, incorporating a number of main hoppers 11, and including a roof 12 provided with a plurality of hatchways normally sealed by removable hatches 13. To the main hopper 11 illustrated, there is detachably secured unloading apparatus 14 embodying the features of the present invention. As shown in Fig. 2, the main hopper 11 is provided with a throat 15 in which there is arranged a sliding door 16 carrying a rack 17 that cooperates with a pinion 18 that is carried by a rotatably mounted shaft 19. Also the extreme lower end of the main hopper 11 is provided with a substantially rectangular bottom outlet 20 that is surrounded by a substantially rectangular outwardly directed flange 21.

As best shown in Figs. 2 and 3, the unloading apparatus 14 essentially comprises an auxiliary hopper 22 and a lower casing 23, the extreme upper end of the auxiliary hopper 22 being provided with a substantially rectangular top inlet opening 24 that is surrounded by a substantially rectangular outwardly directed flange 25. As previously noted, the apparatus 14 is detachably secured to the main hopper 11; and specifically, the flanges 21 and 25 are detachably secured together, with a substantially rectangular sealing gasket 26 therebetween, by any suitable arrangement, such, for example, as the removable C-clamps 27 illustrated. In the arrangement, the sealing gasket 26 is removable along with the apparatus 14, after the removal of the C-clamps 27, and may be formed essentially of sponge rubber, or the like.

The apparatus 14 may be formed essentially of sheet metal, the auxiliary hopper 22 comprising a downwardly directed front wall 28, downwardly and inwardly directed side walls 29, a downwardly and forwardly directed rear wall 30 and a substantially horizontally disposed bottom wall 31. The central portion of the bottom wall 31 has a substantially square bottom opening 32 formed therein and communicating with the top of the casing 23; which bottom opening 32 is provided with a cooperating substantially rectangular gate 33 slidably mounted upon the top surface of the bottom wall 31. Accordingly, the gate 33 is arranged within the bottom of the auxiliary hopper 22 and movable into open and closed positions with respect to the bottom opening 32. For the purpose of controlling movement of the gate 33, an arrangement is provided that includes an elongated screw 34, the inner end of the screw being rotatably mounted in a bracket 35 fixed to the top of the gate 33, and the outer end of the screw 34 projecting through the front wall 28. The shank of the screw 33 is threaded and is received in a cooperating nut 36 rigidly secured to the inner surface of the front wall 28, the extreme outer end of the screw 34 carrying a head 37 accommodating ready rotation thereof. Thus it will be understood that when the head 37 is rotated in one direction, the screw 34 is correspondingly rotated moving the gate 33 longitudinally into its closed position, illustrated in Fig. 3; on the other hand, when the head 37 is rotated in the opposite direction, the screw 34 is correspondingly rotated moving the gate 33 longitudinally into its open position.

The casing 23 comprises a downward extension of the auxiliary hopper 22, disposed below the bottom wall 31 thereof; which casing 23 may comprise a substantially cylindrical longitudinally extending side wall 38 and a forwardly and downwardly extending rear wall 39. More particularly, the rear wall 39 of the casing 23 comprises an extension of the rear wall 30 of the auxiliary hopper 22 disposed below the bottom wall 31 thereof. The front of the longitudinally extending side wall 38 projects forwardly somewhat with respect to the auxiliary hopper 22, thereby providing a tubular suction nozzle or conduit 40 defining a suction outlet 41.

As shown in Figs. 2, 3 and 4, there is arranged in the rear wall 39 of the casing 23, a substantially rectangular auxiliary air inlet opening 42 that is provided with a cooperating substantially rectangular valve element 43, the valve element 43 being arranged within the casing 23 and mounted upon the rear wall 39 by hinge mechanism 44 for movements between open and closed positions with respect to the air inlet opening 42. The valve element 43 is not only biased into its closed position with respect to the air inlet opening 42 by its own weight, but is further biased into its closed position by an associated counterweight 45. More particularly, the counterweight 45 projects rearwardly and downwardly through the air inlet opening 42 and is carried upon a threaded stud 46 that, in turn, is carried by the valve element 43, whereby the position of the counterweight 45 may be adjusted longitudinally of the threaded stud 46 so as effectively to vary the moment thereof about the hinge mechanism 44, and consequently the bias applied by the counterweight 45 to the valve element 43. In the arrangement, the auxiliary air inlet opening 42, formed in the rear wall 39 of the casing 23 is disposed directly below the bottom opening 32 formed in the bottom wall 31 of the auxiliary hopper 22; whereby the valve element 43 is also disposed directly below the bottom opening 32, for a purpose more fully explained hereinafter.

Finally, the rear wall 39 of the casing 23 carries a detachable filter conduit 47 provided with an open outer end 48 and an open inner end surrounded by an outwardly directed flange 49 that is detachably secured to the outer surface of the rear wall 39. Arranged within the filter conduit 47 is a filter bag 50 formed of silk cloth, or the like, for the purpose of preventing dust from being drawn through the auxiliary air inlet opening 42 into the casing 23.

Considering now the general overall operation of the unloading apparatus 14 in conjunction with the hopper-type railway car 10, it may be assumed that the main hopper 11 carries pulverulent material, such, for example, as grain flour that is to be unloaded utilizing the unloading apparatus 14. After the railway car 10 has been blocked in place upon its siding, the plate, not shown, normally covering the bottom outlet 20 of the main hopper 11 and secured to the flange 21, is removed; and the auxiliary hopper 22 of the apparatus 14 is secured in place. More particularly, the sealing gasket 26 is arranged on top of the rectangular flange 25, and the rectangular flange 25 is brought into position below the rectangular flange 21 and secured in place, employing the removable C-clamps 27, so as to obtain an airtight connection between the bottom of the main hopper 11 and the top of the auxiliary hopper 22. At this time, it may be assumed that the gate 33 occupies its closed position with respect to the bottom opening 32, that the valve element 43 occupies its closed position with respect to the auxiliary air inlet opening 42, and that the filter conduit 47 is disconnected from the casing 23.

After the apparatus 14 has thus been assembled upon the bottom of the main hopper 11, the operating shaft 19 is rotated so as to cause the pinion 18 acting upon the rack 17 to move the door 16 into its open position with respect to the throat 15 of the main hopper 11, whereby the pulverulent material contained in the main hopper 11 falls through the bottom outlet 20 filling the auxiliary hopper 22. At this time, the suction nozzle 40 is connected by the associated flexible hose, not shown, to the associated suction equipment, not shown, and operation of the suction equipment mentioned is initiated, whereby a low pressure or suction is produced in the suction nozzle 40 and consequently within the casing 23. The atmospheric pressure acting upon the outer surface of the valve element 43 through the auxiliary air inlet opening 42 unbalances the combination of the low pressure within the casing 23 acting upon the inner surface of the valve element 43, and the weight of the valve element 43 and the counterweight 45, etc.; whereby the valve element 43 is moved from its closed position into its open position, so that auxiliary air is drawn through the auxiliary air inlet opening 42 and into the casing 23, and thence through the suction conduit 40, and ultimately to the suction equipment, not shown.

The operator then manipulates the head 37 so as to move the gate 33 out of its closed position, and at least partially into its open position, with respect to the bottom opening 32, whereby the pulverulent material falls through the bottom opening 32 from the auxiliary hopper 22 into the top of the casing 23, and more particularly upon the rear wall 39 and the valve element 43. The weight of the pulverulent material falling upon the valve element 43 and sliding from the rear wall 39 onto the valve element 43 acts to bias the valve element 43 toward its closed position with respect to the auxiliary air inlet opening 42; whereby there is established a balance between the forces acting upon the valve element 43 so that it assumes a partially open-closed position with respect to the auxiliary air inlet opening 42 so as correspondingly to proportion the pulverulent material and the auxiliary air in the resulting conveying air that is sucked from the suction conduit 40. More particularly, the auxiliary air enters through the auxiliary air inlet opening 42 and sweeps both under the bottom edge of the valve element 43 and around the side edges thereof picking up the pulverulent material sliding forwardly and downwardly along the inner surface of the valve element 43, whereby the pulverulent material is thoroughly mixed and distributed in the conveying air as it is swept forwardly above the extreme bottom of the cylindrical tubular wall 38 of the casing 23 into the suction conduit 40.

Now it will be appreciated that the ratio that is established between the pulverulent material and the total air in the conveying air is not only dependent upon the amount of main air that is carried along with the pulverulent material from the main hopper 11 into the auxiliary hopper 22, but this ratio is also dependent upon the degree of opening of the gate 33 with respect to the bottom opening 32, and the degree of opening of the valve element 43 with respect to the auxiliary air inlet opening 42. Now the amount of main air that is trapped in the pulverulent material in the main hopper 11 is not ordinarily controllable; however, the position of the gate 33 may be readily controlled by manipulation of the head 37 carried upon the extreme outer end of the screw 34; and likewise, the total moment exerted upon the valve element 43 biasing it into its closed position may be selectively adjusted by manipulation of the counterweight 45 upon the extreme outer end of the threaded stud 46. More specifically, the gate 33 is selectively adjusted; and likewise, the moment of the counterweight 45 is selectively adjusted; whereby these adjustments are employed to establish a desired ratio between the pulverulent material and the total air in the conveying air in order to obtain maximum conveying efficiency expressly appropriate to the material being unloaded from the main hopper 11.

Ultimately the filter conduit 47 may be assembled, if desired, upon the rear wall 39 of the casing 23, so as positively to prevent entry of dust with the auxiliary air through the auxiliary air inlet opening 42, the filter bag 50 functioning in a conventional manner when the filter conduit 47 is assembled upon the casing 23.

It is not contemplated that the feed of the pulverulent material from the main hopper 11 into the auxiliary hopper 22 will be governed by the door 16, although manipulation of the shaft 19 will, in fact, accomplish this result. Ordinarily, the shaft 19 is manipulated so as to move the door 16 into its full open position, whereby the feed of the pulverulent material is controlled by the gate 33 disposed between the auxiliary hopper 22 and the casing 23. After the feed of the pulverulent material from the auxiliary hopper 22 through the bottom opening 32 into the casing 23 has been appropriately established by manipulation of the head 37 of the screw 34 correspondingly controlling the gate 33, the regulation of the desired ratio of the pulverulent material and the total air in the conveying air is automatically governed by the pressure within the casing 23, as it will be apparent that the position of the valve element 43 with respect to the auxiliary air inlet opening 42 will be governed by the pressure in the casing 23. Thus in the event of an increase in the suction in the suction conduit 40, and a corresponding reduction in the pressure in the casing 23, the valve element 43 is automatically moved further to open the auxiliary air inlet opening 42 so as to admit more auxiliary air into the casing 23. Conversely, in the event of a decrease in the suction in the suction conduit 40, and a corresponding increase in the pressure in the casing 23, the valve element 43 is automatically moved further to close the auxiliary air inlet opening 42 so as to admit less auxiliary air into the casing 23. Of course, it follows that in the event of complete failure of the suction in the suction conduit 40, the valve element 43 is moved into its completely closed position with respect to the auxiliary air inlet opening 42.

Accordingly, it will be understood that the apparatus 14 not only effects unloading of the pulverulent material from the main hopper 11, but it automatically maintains, after the preliminary adjustments previously explained have been made, the required and optimum ratio of the pulverulent material and the total air in the conveying air therefrom.

The removal of the apparatus 14 from the main hopper 11 after unloading of the pulverulent material therefrom may be accomplished in a ready manner subsequent to detachment of the C-clamps 27.

In view of the foregoing description, it will be appreciated that the apparatus 14 is particularly suitable for the unloading of grain flour from the main hopper 11 of the railway car 10, all without contamination of the grain flour incident to the unloading and suction-conveying thereof, and in a ready and simple manner.

In this connection, it is noted that when the apparatus 14 is to be used primarily for the unloading of grain flour or other edible pulverulent material, it is very advantageous to form the parts thereof of steel, and then to provide, at least upon the interior surfaces thereof, a nickel coating utilizing a plating bath of the nickel cation-hypophosphite anion type. For example, the interior surfaces of the elements of the apparatus 14 may be provided with a chemical nickel coating or plating in accordance with the process disclosed in U. S. Patent No. 2,658,842, granted on November 10, 1953, to Gregoire Gutzeit and Ernest J. Ramirez, this coating comprising an alloy of nickel and phosphorous, and containing about 5 to 11% phosphorous by weight. The provision of this nickel coating is highly useful in that it not only positively prevents contamination of the grain flour by rust, or the like, but it is also relatively hard and very abrasion-resistant.

In the foregoing, the construction and arrangement of the unloading apparatus 14 have been described in conjunction with the unloading of grain flour, or the like, from a railway car 10 of the conventional hopper-type, as illustrated in Figs. 1 and 2 of the drawing; however, it is noted that the apparatus 14 is particularly advantageous in the unloading of such material from a railway car of the hopper-type in which the material is discharged in a fluidized condition, such, for example, as the hopper-type railway car of the improved construction and arrangement disclosed in the copending application of Edmund R. Aller, Serial No. 383,564, filed October 1, 1953, now Patent No. 2,789,739, April 23, 1957. In this improved railway car, the discharge of the pulverulent material under the influence of gravity is assisted by the aeration of the material at the bottom of the hopper through the use of aerating equipment of the character of that disclosed in U. S. Patent No. 2,589,868, granted on March 18, 1952, to Henry R. Schemm. Thus, employing this combination of equipment, the pulverulent material is fluidized as it is discharged from the railway car hopper into the unloading apparatus, thereby providing a substantially uniform flow thereof into the apparatus and insuring an altogether even and uniform flow of the material from the apparatus into the associated suction system.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for unloading pulverulent material from a main hopper provided with a bottom outlet, said apparatus comprising an auxiliary hopper adapted to be detachably secured to said main hopper below said bottom outlet and communicating therewith and provided with a bottom opening, a casing carried by said auxiliary hopper below said bottom opening and communicating therewith, whereby pulverulent material is fed from said main hopper through said bottom outlet into said auxiliary hopper and thence therefrom through said bottom opening into said casing, said casing including a downwardly and forwardly directed rear wall and a connecting forwardly directed bottom wall, said rear wall having an air inlet opening therein disposed somewhat above said bottom wall, the front of said casing also being provided with a suction outlet opening therein, whereby air is fed through said air inlet opening forwardly over said bottom wall into said casing and mixed with the pulverulent material therein and the resulting conveying air laden with the pulverulent material is drawn forwardly through said casing and thence therefrom through said suction outlet opening, and a valve element arranged in said casing in covering relation with said air inlet opening and pivoted adjacent to the upper portion thereof upon said rear wall for movements into closed and open positions with respect to said air inlet opening, whereby the weight of said valve element biases it toward its closed position and the pressure of the air fed through said air inlet opening forwardly into said casing biases said valve element toward its open position, said valve element being disposed below said bottom opening so that the pulverulent material fed from said auxiliary hopper through said bottom opening into said casing falls upon said valve element and also biases it toward its closed position, and wherein the pulverulent material falling upon said valve element moves downwardly and forwardly thereon toward said bottom wall and into the air fed through said air inlet opening forwardly over said bottom wall into said casing.

2. The apparatus set forth in claim 1, wherein said valve element is essentially in the form of a plate pivoted adjacent to the upper edge thereof upon said rear wall, whereby said valve element in its closed position is disposed in contact with said rear wall and substantially in the plane thereof and in its open position is disposed out of contact with said rear wall and in a plane positioned at an angle to the plane of said rear wall.

3. Apparatus for unloading pulverulent material from a main hopper provided with a bottom outlet; said apparatus comprising an auxiliary hopper adapted to be detachably secured to said main hopper below said bottom outlet and communicating therewith and provided with a bottom opening, a casing carried by said auxiliary hopper below said bottom opening and communicating therewith, whereby pulverulent material is fed from said main hopper through said bottom outlet into said auxiliary hopper and thence therefrom through said bottom wall into said casing, said casing including a downwardly and forwardly directed rear wall and a connecting forwardly directed bottom wall, said rear wall having an air inlet opening therein disposed in proximity to said bottom wall, the front of said casing being also provided with a suction outlet opening therein, whereby air is fed through said air inlet opening forwardly over said bottom wall into said casing and mixed with the pulverulent material therein and the resulting conveying air laden with the pulverulent material is drawn forwardly through said casing and thence through said suction outlet opening, and a plate valve for said air inlet opening pivoted along its upper edge on said rear wall below said bottom opening to open inwardly with its lower edge adjacent said bottom wall when it is closed, whereby the weight of the valve and the pressure of the incoming material tends to move said valve toward its closed position in opposition to the action of the suction from said outlet opening and the pressure of the incoming air through said inlet opening tends to move said valve toward its open position and to sweep the materials outwardly along the bottom of said casing.

4. Apparatus for unloading pulverulent material from a main hopper provided with a bottom outlet, said apparatus comprising an auxiliary hopper adapted to be detachably secured to said main hopper and communicating therewith through said bottom outlet and provided with a bottom opening, a casing carried by said auxiliary hopper below said bottom opening and communicating therewith, whereby pulverulent material is fed from said main hopper through said bottom outlet into said auxiliary hopper and thence therefrom through said bottom opening into said casing, said casing including a downwardly and forwardly directed rear wall provided with an air inlet opening therein, the front of said casing also being provided with a suction outlet opening therein, whereby air is fed through said air inlet opening forwardly into said casing and mixed with the pulverulent material therein and the resulting conveying air laden with the pulverulent material is drawn forwardly through said casing and thence therefrom through said suction outlet opening, a valve element arranged in said casing and mounted adjacent to the upper portion thereof upon said rear wall for pivotal movements into closed and open positions with respect to said air inlet opening, and means biasing said valve element toward its closed position, whereby the pressure of the air fed through said air inlet opening forwardly into said casing moves said valve element against said biasing means into its open position so that the position of said valve element is controlled in accordance with the pressure in said casing, said valve element being disposed below said bottom opening so that the pulverulent material fed from said auxiliary hopper through said bottom opening into said casing falls upon said valve element and is then moved downwardly and forwardly therefrom into the air fed through said air inlet opening forwardly into said casing.

5. Apparatus for unloading pulverulent material from a main hopper provided with a bottom outlet; said apparatus comprising an auxiliary hopper adapted to be detachably secured to said main hopper below said bottom outlet and communicating therewith and provided with a bottom opening, a casing carried by said auxiliary hopper below said bottom opening and communicating therewith, whereby pulverulent material is fed from said main hopper through said bottom outlet into said auxiliary hopper and thence therefrom through said bottom wall into said casing, said casing including a downwardly and forwardly directed rear wall and a connecting forwardly directed bottom wall, said rear wall having an air inlet opening therein disposed in proximity to said bottom wall, the front of said casing being also provided with a suction outlet opening therein, whereby air is fed through said air inlet opening forwardly over said bottom wall into said casing and mixed with the pulverulent material therein and the resulting conveying air laden with the pulverulent material is drawn forwardly through said casing and thence through said suction outlet opening, and a plate valve for said inlet opening movable inwardly into said casing and below said bottom opening to uncover the inlet opening so that pulverulent material fed from said auxiliary hopper through the bottom opening thereof into said casing falls upon the plate valve and then moves downwardly and forwardly therealong into the air fed through said air inlet opening forwardly into said casing.

6. The apparatus of claim 5 in which said plate valve is pivoted along the upper edge thereof on said rear wall at a location below said bottom opening, whereby air admitted into said casing through said air inlet opening sweeps the materials outwardly along the bottom of said casing.

7. In apparatus adapted for use in unloading pulverulent material from a main hopper provided with a bottom outlet, an auxiliary hopper adapted to be positioned beneath such bottom outlet from receiving material therethrough and having a bottom opening for discharging such material therefrom, a casing disposed below said auxiliary hopper in communication with said bottom opening for receiving material therefrom, said casing having a downwardly and forwardly directed rear wall extending beneath said bottom opening and having also a forwardly directed bottom wall connecting with said rear wall, said rear wall having an air inlet opening therein adjacent said bottom wall and the forward end portion of said casing being provided with a suction outlet opening therein whereby air is fed through said air inlet opening forwardly over said bottom wall for admixture with pulverulent material in said casing and thence outwardly through said suction outlet opening, and a valve for controlling said air inlet opening, said valve being movable carried by said rear wall for uncovering said air inlet opening upwardly from the lowermost edge thereof so that air admitted therethrough sweeps along said bottom wall to pick up pulverulent material moving along said rear wall downwardly and forwardly toward said bottom wall thereof.

8. The apparatus of claim 7 in which said valve is pivotally mounted along the upper edge thereof within said casing, whereby the weight of the valve and the force of the incoming material falling thereagainst tend to move the valve toward its closed position along said rear wall in opposition to the suction developed within said casing from said outlet opening and the pressure of the air acting thereagainst in the movement thereof through said inlet opening.

References Cited in the file of this patent

UNITED STATES PATENTS

| | | |
|---|---|---|
| 2,190,726 | McKenna | Feb. 20, 1940 |
| 2,378,553 | Hornbrook | June 19, 1945 |
| 2,393,932 | Petroe | Jan. 29, 1946 |
| 2,595,654 | Hale | May 6, 1952 |
| 2,647,802 | Hornbrook | Aug. 4, 1953 |
| 2,695,196 | Talmey | Nov. 23, 1954 |